United States Patent
Pagano

(10) Patent No.: US 9,003,957 B2
(45) Date of Patent: Apr. 14, 2015

(54) APPARATUS FOR THE PREPARATION OF A HOT BEVERAGE, IN PARTICULAR A MILK-BASED BEVERAGE

(75) Inventor: Gaetano Pagano, Florence (IT)

(73) Assignee: Luigi Lavazza S.p.A., Turin (IT)

( * ) Notice: Subject to any disclaimer, the term of this patent is extended or adjusted under 35 U.S.C. 154(b) by 116 days.

(21) Appl. No.: 13/820,378

(22) PCT Filed: Sep. 1, 2011

(86) PCT No.: PCT/IB2011/053836
§ 371 (c)(1),
(2), (4) Date: Mar. 1, 2013

(87) PCT Pub. No.: WO2012/029047
PCT Pub. Date: Mar. 8, 2012

(65) Prior Publication Data
US 2013/0152798 A1    Jun. 20, 2013

(30) Foreign Application Priority Data

Sep. 2, 2010 (IT) .............................. TO2010A0731

(51) Int. Cl.
| | | |
|---|---|---|
| A47J 31/40 | (2006.01) | |
| A47J 31/44 | (2006.01) | |
| A23F 3/00 | (2006.01) | |
| A23L 2/54 | (2006.01) | |
| B01F 3/04 | (2006.01) | |
| A47J 31/60 | (2006.01) | |
| A47J 43/044 | (2006.01) | |

(52) U.S. Cl.
CPC .............. *A47J 31/60* (2013.01); *A47J 31/4489* (2013.01); *A47J 43/044* (2013.01)

(58) Field of Classification Search
CPC ...... A47J 31/60; A47J 31/4489; A47J 43/044
USPC ................ 99/280, 287, 293, 294, 323.1, 290; 134/22.11
See application file for complete search history.

(56) References Cited

U.S. PATENT DOCUMENTS

| | | | |
|---|---|---|---|
| 7,644,652 B2 * | 1/2010 | Eimer et al. | ..................... 99/293 |
| 2005/0259508 A1 | 11/2005 | Rohde et al. | |

(Continued)

FOREIGN PATENT DOCUMENTS

| | | |
|---|---|---|
| EP | 1264567 A2 | 12/2002 |
| EP | 1440648 A1 | 7/2004 |

(Continued)

OTHER PUBLICATIONS

International Search Report of PCT/IB2011/053836, dated Dec. 6, 2011.

*Primary Examiner* — Tu B Hoang
*Assistant Examiner* — Lindsey C Teaters
(74) *Attorney, Agent, or Firm* — Sughrue Mion, PLLC

(57) ABSTRACT

An apparatus for preparing a hot beverage. The apparatus includes a hot steam source for supplying a flow of steam into a vessel, a rotary stirring device including a rotatable shaft which carries a stirring rotor; and a cleaning container. A control unit controls movement of the stirring device between its rest position and its working position; the activation of the steam source and of the stirring device while the shaft and the rotor of the latter extend inside a vessel; and the activation of the steam source and of the stirring device while the shaft and the rotor of the latter extend in the cleaning container.

8 Claims, 4 Drawing Sheets

(56) References Cited

U.S. PATENT DOCUMENTS

2011/0017073 A1    1/2011  Morin et al.
2011/0111109 A1*   5/2011  Fischer et al. ................ 426/474
2011/0192287 A1*   8/2011  Riessbeck et al. .............. 99/285

FOREIGN PATENT DOCUMENTS

FR      2929091 A1   10/2009
WO   2009/130661 A2   10/2009

* cited by examiner ically indicated CM in FIGS. 1 to 4. The machine comprises

APPARATUS FOR THE PREPARATION OF A HOT BEVERAGE, IN PARTICULAR A MILK-BASED BEVERAGE

CROSS REFERENCE TO RELATED APPLICATIONS

This is a National Stage of International Application No. PCT/IB2011/053836 filed Sep. 1, 2011, claiming priority based on Italian Patent Application No. TO2010A000731 filed Sep. 2, 2010, the contents of all of which are incorporated herein by reference in their entirety.

The present invention relates to an apparatus for the preparation of a hot beverage, in particular a milk-based beverage such as a so-called "cappuccino", hot chocolate, or the like, which apparatus is also suitable for domestic use and can also be constructed in the form of an accessory that can be combined with or incorporated in a conventional coffee-making machine.

An apparatus of this type is described, for example in the Applicant's International patent application WO2009/130661A2.

Apparatuses of this type comprise a rotary stirring device which, after use, is soiled with milk, etc. This rotary stirrer is awkward to clean.

An object of the present invention is to propose an apparatus for the preparation of hot beverages, in particular milk-based beverages, which overcomes the problems discussed above with reference to apparatuses of the prior art.

This and other objects are achieved, according to the invention, by an apparatus comprising:

a structure wherein there is defined a working area in which a vessel can be positioned for the preparation of the beverage;

a hot steam source suitable for supplying a flow of steam into a vessel or container arranged in the working area, a rotary stirring device comprising a rotatable shaft which carries a stirring rotor; the stirring device being movable relative to the structure between a raised, rest position and a lowered, working position in which the shaft and the associated rotor can extend above the working area and in the working area inside a vessel or container positioned therein, respectively;

a substantially beaker-shaped or cup-shaped cleaning container which is movable relative to the structure between a rest position and a position of use in which the cleaning container extends outside and inside the working area, respectively; in the position of use, the cleaning container being suitable for receiving the shaft and the rotor of the rotary stirring device that has been lowered from the rest position; and control means suitable for bringing about:

the movement of the stirring device between its rest position and its working position;

the activation of the steam source and of the stirring device whilst the shaft and the rotor of the latter extend in a vessel arranged in the working area for the preparation of a beverage; and the activation of the steam source and of the stirring device whilst the shaft and the rotor of the latter extend in the cleaning container in the working area.

Further characteristics and advantages of the invention will become clear from the following detailed description which is given purely by way of non-limiting example, with reference to the appended drawings, in which.

Figure 5:
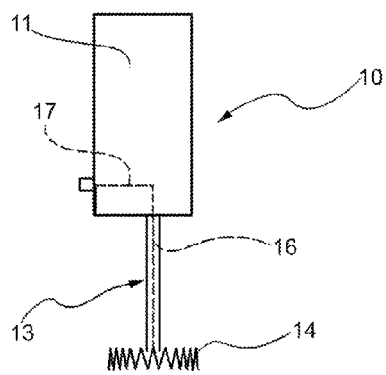
Figure 6:
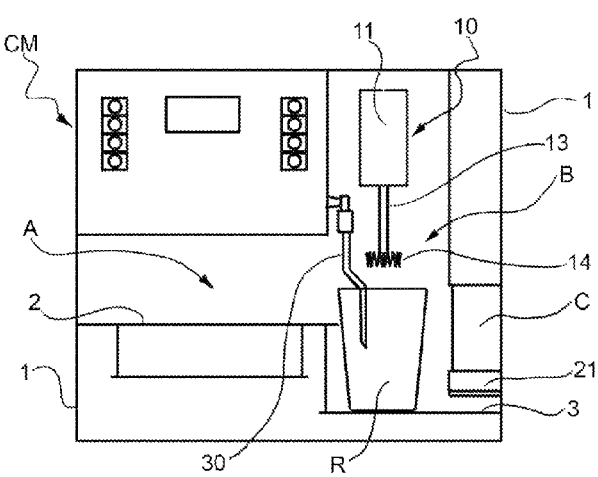

FIG. 5 is a schematic view of a rotary stirring device in which the hot steam can be supplied into a vessel or container through the rotatable stirring shaft; and FIG. 6 is a schematic front view of a variant in which the apparatus according to the invention shares the steam source of a coffee-making machine in which it is incorporated, the source including a conventional steam-dispensing nozzle or lance.

An apparatus according to the invention for the preparation of hot beverages will now be described in detail with reference to an embodiment in which the apparatus is incorporated as an accessory in a conventional espresso coffee-making machine.

The apparatus according to the invention may, however, also be constructed in a "stand-alone" version, that is, as an independent apparatus.

An espresso coffee-making machine of known type is generally indicated CM in FIGS. 1 to 4. The machine comprises a support housing 1 in the front portion of which two working areas, indicated A and B respectively, are defined.

The working area A is intended for the preparation of espresso coffee which is poured into one or more small cups or the like (not shown), that are positioned on a support surface 2 beforehand.

The working area B is intended for the preparation of hot beverages, in particular milk-based beverages, by means of an apparatus according to the invention. A beverage of this type is prepared in particular in a vessel R (FIG. 2) such as, for example, a glass which is placed on a support surface 3 of the working area B.

The apparatus according to the present invention comprises a hot steam source. In the embodiment shown by way of example in FIGS. 1 to 4, the steam source is that with which the coffee-making machine CM is typically provided; in the embodiment shown schematically in FIG. 4, the steam source comprises a water reservoir 4 from which a pump 5 draws a flow of water which it sends to a heat exchanger 6, for example, of the so-called instantaneous type, which is provided with a heating resistor 7. In the heat exchanger 6, the flow of water is converted into a flow of hot steam which is sent towards a rotary stirring device 10, for example, through a flexible duct 8.

Steam sources of other types may however be used to send a flow of hot steam into the vessel R that is arranged in the working area B.

In the embodiment shown, the stirring device 10 is mounted in the front portion of the support housing 1 of the coffee-making machine CM.

Figure 1:
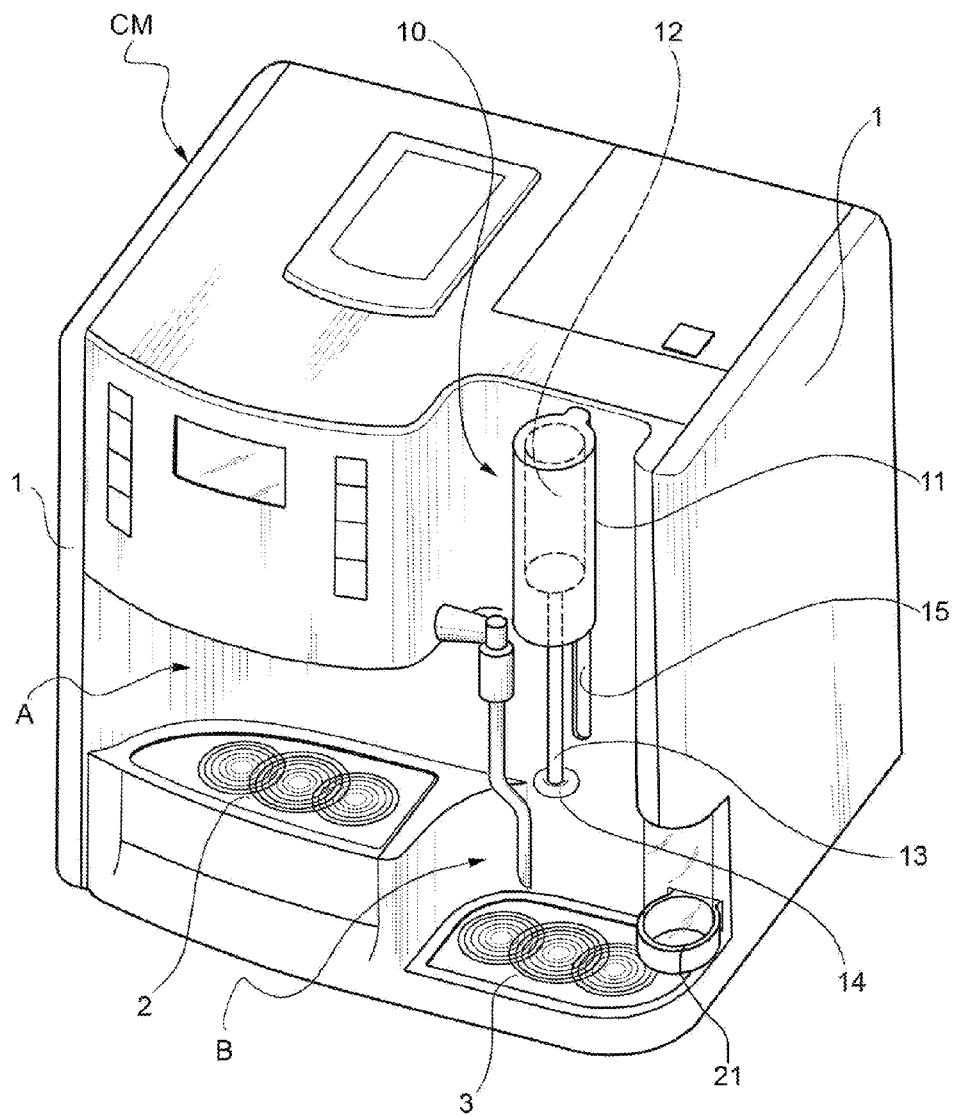
FIG. 1 is a perspective view of an apparatus according to the invention, incorporated in an espresso coffee-making machine in which a rotary stirring device of the apparatus is shown in the raised, rest position.

With reference to FIG. 1, in the embodiment illustrated, the stirring device 10 comprises a housing 11 which houses an electric motor 12 (shown in broken outline in FIG. 1) suitable for rotating a rotatable shaft 13 which carries, at its lower end, a stirring rotor 14 of known type.

The shaft 13 and the associated rotor 14 extend below the housing 11.

Figure 2:
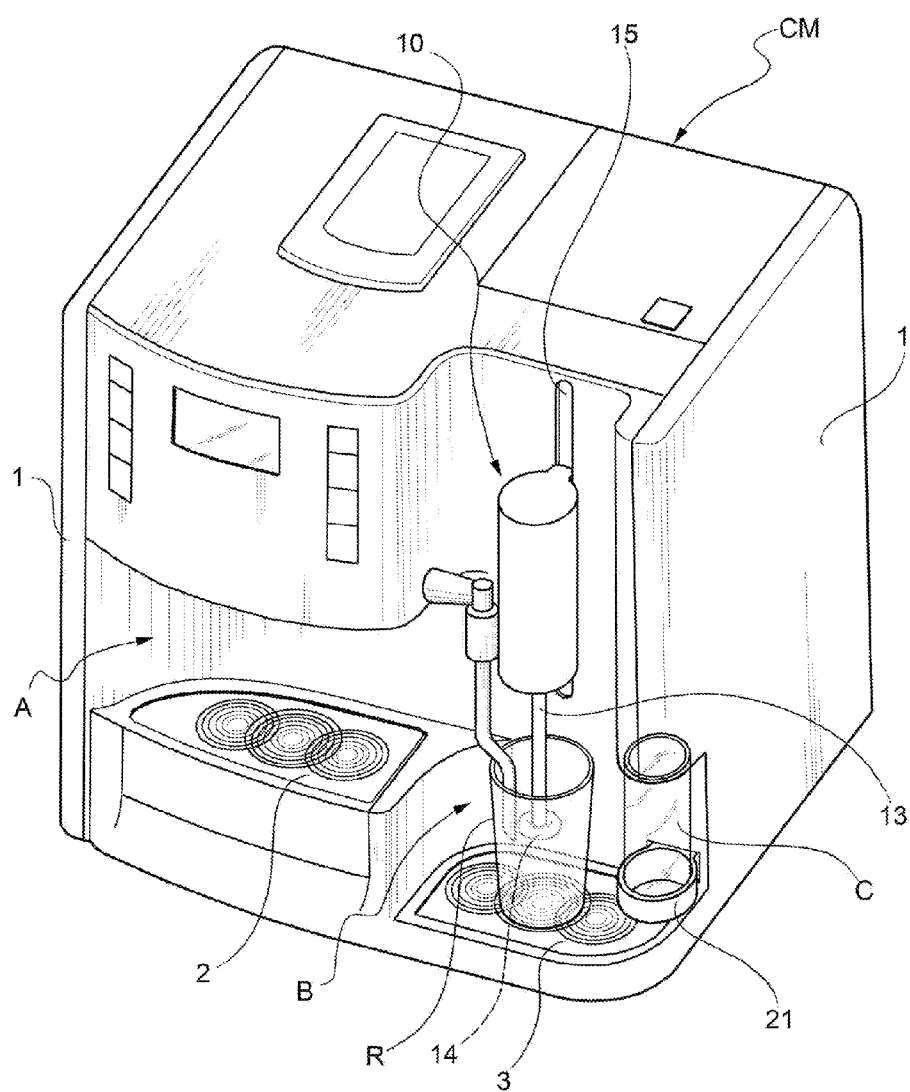
FIG. 2 is a view similar to that of FIG. 1 and shows the rotary stirring device in the lowered, working position for the preparation of a hot beverage.

The rotary stirring device 10 is movable relative to the support housing 1 of the machine CM between a raised, rest position shown in FIG. 1, in which it allows a vessel R to be positioned in the working area B for the preparation of a beverage, and a lowered, working position shown in FIG. 2, in which the shaft 13 and the associated stirring rotor 14 extend in the working area in the vessel R positioned therein.

For this purpose, the stirring device 10 may advantageously be mounted so as to be slidable along a vertical guide 15 provided in the support housing 1 of the coffee-making machine CM.

Figure 4:
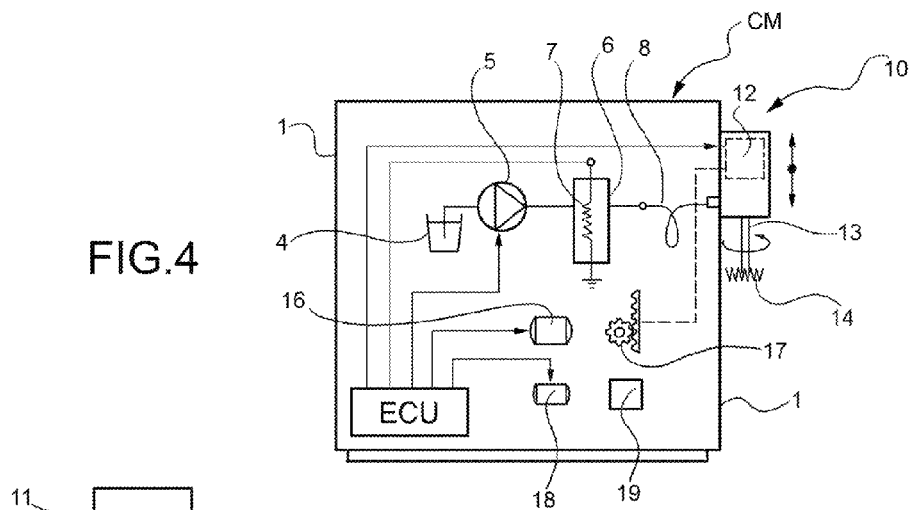
FIG. 4 is a schematic view of an apparatus according to the invention, incorporated in a coffee-making machine, a hot steam source of which it shares.

The arrangement may be such that the stirring device 10 is movable between its rest position and its working position by means of an electrically-operated drive device, for example, including an electric motor 16 and a transmission 17 of the rack-and-pinion type (see FIG. 4). The stirring device 10 may, however, also simply be movable manually along the guide 15 between the two above-mentioned positions and may be held in the working position and in the rest position by means of suitable known retaining devices.

In the embodiment shown in FIGS. 1 to 5, the rotatable shaft 13 of the stirring device 10 has a longitudinal internal conduit which is shown in broken outline and indicated 16 in FIG. 5. This conduit is in communication, at the top, with a substantially transverse duct 17 provided in the housing 11 and communicating with the steam source 4-7 by means of the flexible duct 8 (FIG. 4).

In this embodiment, the rotary stirring device 10 acts, at the same time, as a device for heating the milk or the like which is poured into the vessel R and is intended to be emulsified and "whipped", for example, for the preparation of a cappuccino.

As shown schematically in FIG. 4, an electronic control unit ECU may be provided for coordinating the operation of the steam source (by means of the electric pump 5 and the resistor 7 of the exchanger 6) with the movement of the stirring device 10 (controlled by means of the electric motor 16 and the associated transmission 17), as well as with the rotation of the shaft 13 and of the associated stirring rotor 14 (controlled by the electric motor 12), in dependence on commands imparted by the user, for example, by means of a control keypad.

The electronic unit ECU is arranged, in particular, to bring about the movement of the stirring device 10 between its rest position and its working position and the activation of the steam source 4-7 and of the stirring device 10 whilst the shaft 13 and the associated rotor 14 extend in the vessel R which is arranged in the working area B for the preparation of a hot beverage.

Upon completion of the preparation of a hot beverage, the stirring device 10 is returned to the raised, rest position shown in FIG. 1. The vessel R can then be removed from the working area B. Further ingredients, such as espresso coffee and, optionally, chocolate powder may be added to the whipped hot milk in the vessel in order to prepare a cappuccino or the like.

The above-described apparatus may advantageously, but not necessarily, be equipped with accessories which will now be described, to permit cleaning and sterilization of the rotatable shaft 13 and of the associated stirring rotor 14 which are inevitably soiled after the preparation of the hot beverage.

Figure 3:
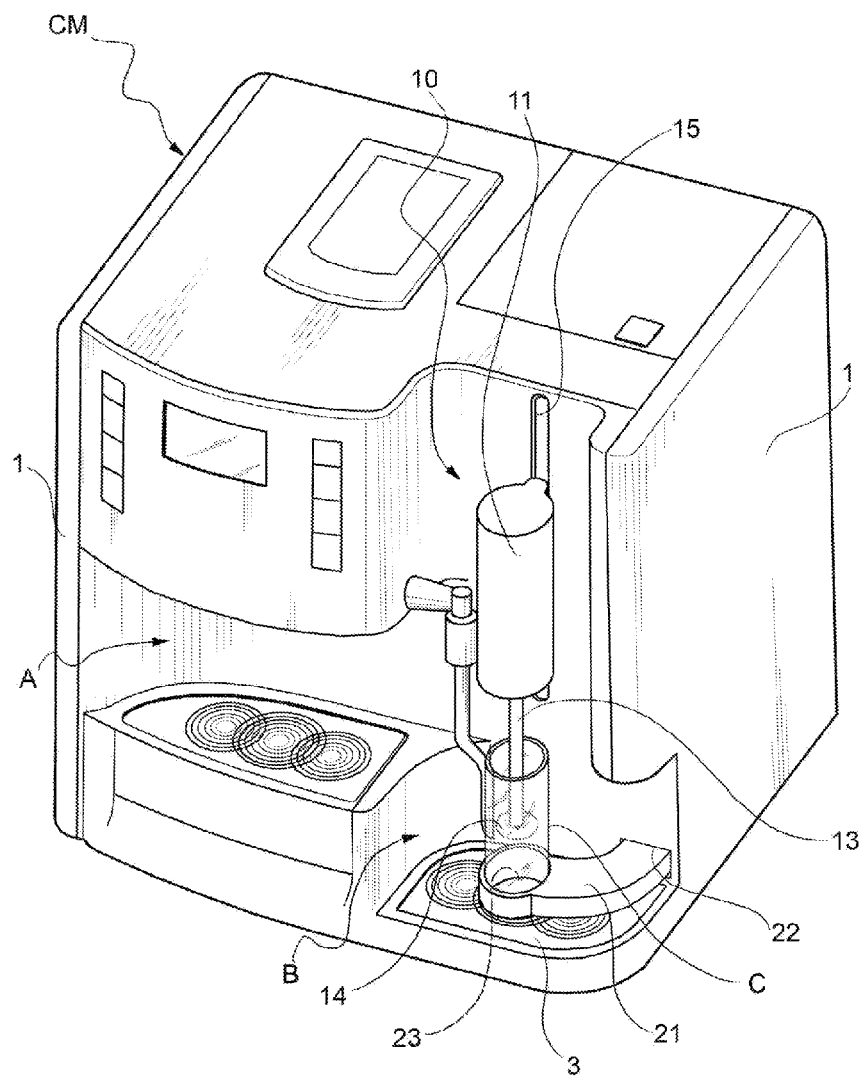
FIG. 3 is a view similar to the preceding drawings and shows the rotary stirring device in the lowered position, partially immersed in a cleaning container for the cleaning of its rotary stirring element.

In the embodiment shown, the apparatus comprises a substantially beaker-shaped or cup-shaped cleaning container, indicated C in FIGS. 1 to 3 and 6 (see FIG. 3 in particular).

In the embodiment shown, the cleaning container C is carried by the end of an arcuate support arm 21 which can be moved horizontally relative to the support housing 1 of the machine CM through an opening 22 in the housing (FIG. 3).

The support arm 21 and the associated cleaning container C are movable, in particular, between a rest position shown in FIGS. 1, 2 and 6 in which they extend outside the working area B, and a position of use, shown in FIG. 3, in which they extend in the working area B with the cleaning container C beneath the stirring device and hot steam dispenser 10.

The support arm 21 and the associated cleaning container C can be moved between their rest positions and their positions of use manually or in a motorized manner, for example, by means of an electric motor 18 and an associated transmission 19 which are shown schematically in FIG. 4 and, advantageously, are controlled by the same control unit ECU which was described above.

By means of a command imparted, for example, by means of a suitable push-button, the user can activate a quick cleaning cycle of the stirring device and steam source, which takes place substantially in the manner that will now be described.

The cleaning cycle is started whilst the rotary stirring device 10 and the cleaning container C are in their respective rest positions (FIG. 1).

As a result of the starting of the cleaning cycle, the support arm 21 and the cleaning container C are moved from the rest position to the position of use and the stirring device 10 is then moved down to the lowered position so that its shaft 13 and the associated stirring rotor 14 extend in the cleaning container C, as shown in FIG. 3. In this condition, the hot steam source 4-7 and the electric motor 12 of the stirring device 11 are activated. A flow of hot steam thus passes through the longitudinal conduit 16 inside the shaft 13 and then emerges from the lower end thereof, inside the cleaning container C, and thus collides with the stirring rotor 14 as well as the outer surface of the shaft 13. The combined effect of the action of the flow of steam at high temperature and of the speed of rotation imparted to the shaft 13 and to the rotor 14 brings about detachment of the residues of milk etc. which are present inside and outside the shaft 13 and the rotor 14. The high temperature of the steam also has the effect of sterilizing the shaft 13 and the associated rotor 14 which are cleaned automatically in a few seconds.

Owing to the centrifugal force, the steam (and the residues of milk etc. transported thereby) is thrust onto the internal surface of the cleaning container C and cools thereon, condensing into drops which can advantageously be discharged through one or more drain holes provided in the cleaning container C, such as the hole indicated 23 in FIG. 3.

Upon completion of the cleaning cycle, which may typically last for about ten seconds, both the unit formed by the shaft 13 and by the rotor 14, and the cleaning container C, are completely clean and sterilized.

These elements may advantageously be made of materials having anti-stick properties to prevent adhesion and thus facilitate the detachment of the residues. Upon completion of the cleaning cycle, the stirring device 10 is returned to the raised, rest position and the support arm 21 with the associated cleaning container C is returned to the rest position.

In the above-described embodiments, the hot steam is supplied for the preparation of a beverage, as well as for any subsequent cleaning cycle, through an axial conduit 16 provided in the same shaft 13 which carries the stirring rotor 14.

FIG. 6 shows a variant in which the machine CM comprises, in known manner, a hot-steam dispensing nozzle or lance, indicated 30, which is located so as to be able to supply a flow of hot steam into the vessel R for the preparation of a beverage and into the cleaning container C when it is arranged in the working area B.

For this variant, the methods of operation for the preparation of a beverage and for an optional cleaning cycle are also very similar to those that are implemented in the embodiment described above.

Naturally, the principle of the invention remaining the same, the forms of embodiment and details of construction may be varied widely with respect to those described and illustrated purely by way of non-limiting example, without thereby departing from the scope of the invention as defined in the appended claims.

The invention claimed is:

1. An apparatus for the preparation of hot, milk-based beverages, comprising:
   a structure wherein there is defined a working area in which a vessel can be positioned for the preparation of the beverage;
   a hot steam source arranged for supplying a flow of steam into the vessel positioned in the working area,
   a rotary stirring device comprising a rotatable shaft which carries a stirring rotor, the stirring device being movable relative to the structure between a raised, rest position and a lowered, working position, in which the rotatable shaft and the stirring rotor can extend above the working area and in the working area inside the vessel positioned therein, respectively;
   a substantially beaker-shaped cleaning container which is movable relative to the structure between an offset position and a position of use in which the cleaning container extends outside and inside the working area, respectively, in the position of use, the cleaning container being configured to receive the shaft and the rotor of the stirring device that has been lowered from the rest position;
   control means arranged for bringing about:
      the movement of the stifling device between the rest position and the working position;
      the activation of the steam source and of the stirring device whilst the shaft and the rotor extend in the vessel arranged in the working area for the preparation of the beverage; and
      the activation of the steam source and the rotation of the stifling device whilst the shaft and the rotor extend in the cleaning container in the working area during a cleaning phase; and
   a support arm controlled by said control means for bringing about the movement of the cleaning container between the offset position and the position of use.

2. An apparatus according to claim 1, wherein the cleaning container has a drain or discharge opening in its lower portion.

3. An apparatus according to claim 1, wherein the cleaning container is movable horizontally between the offset and use positions.

4. An apparatus according to claim 1, wherein the structure is the structure of a coffee-making machine with which the apparatus is associated and which is provided with a steam source that is shared with the apparatus.

5. An apparatus according to claim 4, wherein the coffee-making machine has a dispensing nozzle or lance which can be connected to the steam source and can supply a flow of steam into the vessel arranged in the working area.

6. An apparatus according to claim 1, wherein the rotatable shaft of the stirring device is provided with a longitudinal conduit which is connected or connectible to the steam source and which opens into the working area when the stifling device is in the lowered working position.

7. An apparatus according to claim 1, further comprising drive means for bringing about the movement of the stifling device.

8. An apparatus according to claim 1, wherein the stirring device comprises an electric motor for rotating the shaft and the associated rotor.

* * * * *